(12) United States Patent
Wu (10) Patent No.: US 7,397,462 B2
(45) Date of Patent: Jul. 8, 2008

(54) WIRED/WIRELESS CHARGEABLE MOUSE

(76) Inventor: Chia-Chun Wu, P.O. Box No. 6-57, Junghe, Taipei 235 (TW)

( * ) Notice: Subject to any disclaimer, the term of this patent is extended or adjusted under 35 U.S.C. 154(b) by 448 days.

(21) Appl. No.: 11/108,802

(22) Filed: Apr. 19, 2005

(65) Prior Publication Data
US 2006/0232555 A1    Oct. 19, 2006

(51) Int. Cl.
*G06F 3/033*   (2006.01)
*G09G 5/08*    (2006.01)
*G09G 5/00*    (2006.01)

(52) U.S. Cl. ....................................................... 345/163

(58) Field of Classification Search ......... 345/163–166, 345/184
See application file for complete search history.

(56) References Cited

U.S. PATENT DOCUMENTS

| | | | | |
|---|---|---|---|---|
| 6,088,021 A * | 7/2000 | Yong | ............................ | 345/163 |
| 6,225,981 B1 * | 5/2001 | Lu | .............................. | 345/164 |
| 6,304,249 B1 * | 10/2001 | Derocher et al. | ............. | 345/163 |
| 6,970,156 B1 * | 11/2005 | Silverstein | .................... | 345/163 |
| 2002/0118172 A1 * | 8/2002 | Jzuhsiang | ..................... | 345/163 |
| 2003/0071783 A1 * | 4/2003 | Chen | ........................... | 345/156 |
| 2003/0184521 A1 * | 10/2003 | Sugita | ......................... | 345/163 |
| 2003/0193476 A1 * | 10/2003 | Lu | ............................... | 345/163 |
| 2003/0197684 A1 * | 10/2003 | Smith et al. | ................... | 345/163 |
| 2004/0252106 A1 * | 12/2004 | Koh | ............................. | 345/163 |
| 2005/0206617 A1 * | 9/2005 | Moyer et al. | .................. | 345/163 |
| 2006/0007147 A1 * | 1/2006 | Lee | .............................. | 345/163 |
| 2006/0221055 A1 * | 10/2006 | Chang et al. | .................. | 345/163 |

* cited by examiner

*Primary Examiner*—Alexander Eisen
*Assistant Examiner*—Chanelle N Mack
(74) *Attorney, Agent, or Firm*—Troxell Law Office, PLLC (57) ABSTRACT

A wired/wireless chargeable mouse, within which is configured a coil winding mechanism that is used to rewind a connecting wire and a connector into the mouse. When using the mouse in wired mode, a charging circuit of a circuit board charges a battery within the mouse using electric power transmitted from a host computer through the connector and the connecting wire. Furthermore, light-emitting diodes of the circuit board produce different luminescent displays corresponding to different states of the mouse.

7 Claims, 9 Drawing Sheets

WIRED/WIRELESS CHARGEABLE MOUSE

BACKGROUND OF THE INVENTION (a) Field of the Invention

The present invention relates to a wired/wireless chargeable mouse, wherein a connector is configured on one end of a connecting wire of a coil winding mechanism. Pulling out the connector simultaneously actuates the coil winding mechanism, which outwardly extends the connecting wire. Furthermore, a through hole is defined on a side edge of a mouse cover, which is used to press fit the connecting wire after extending.

Control signals are transmitted through the connector when the connector is connected to a host computer facility, moreover, electric power from the host computer is simultaneously transmitted to a battery compartment within the mouse and charges a battery disposed therein.

Light-emitting diodes are disposed within the mouse, and produce different luminescent displays corresponding to different states of the mouse, for instance, low battery state, charging state, the mouse being used in wireless mode or the mouse being used in wired mode. Furthermore, a transparent casing is used as a bottom cover of the mouse, thereby enabling light rays emitted by the light-emitting diodes to pass therethrough.

(b) Description of the Prior Art

Figure 1:
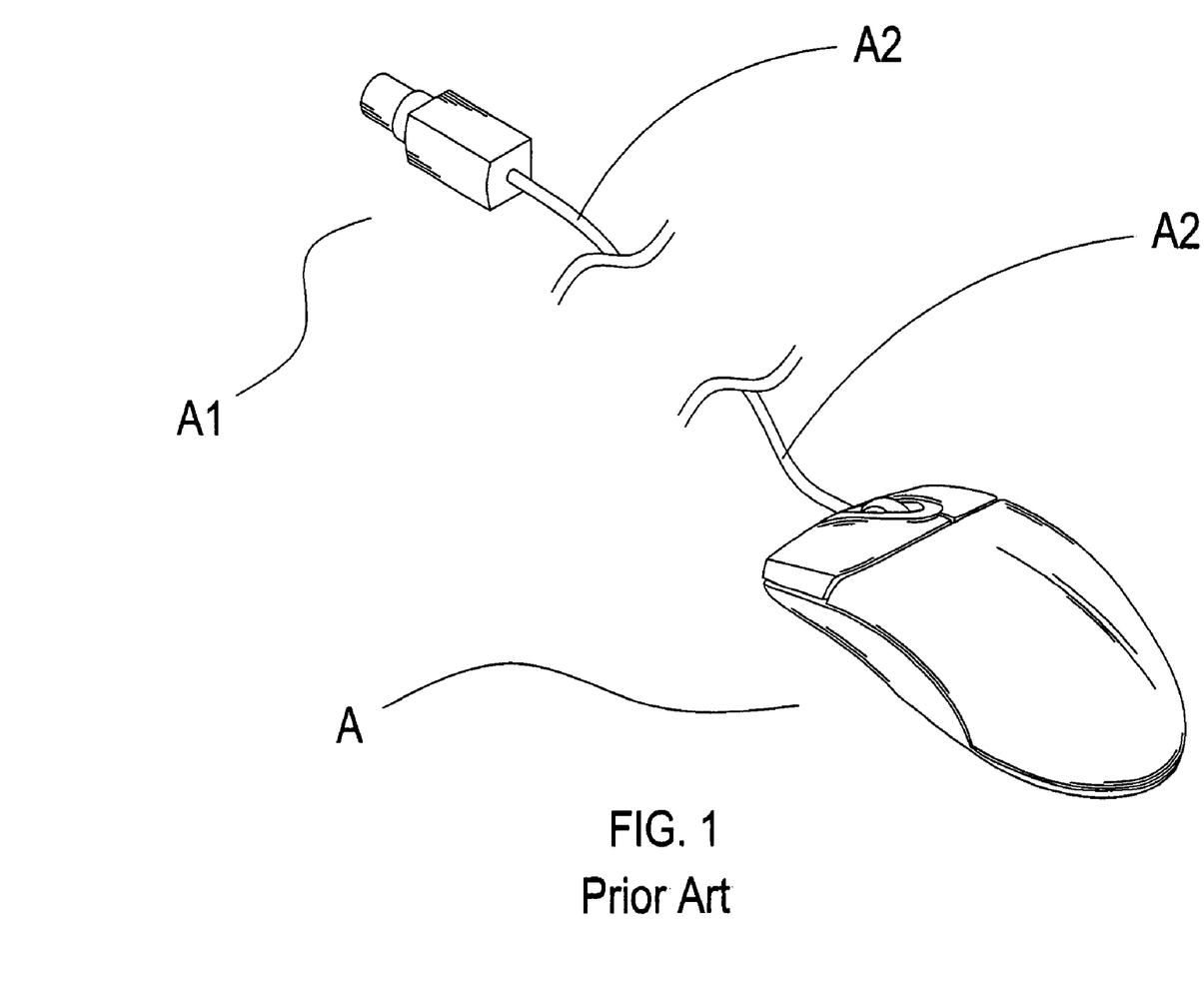
FIG. 1 shows an elevational view of a conventional wired mouse.

A conventional mouse is categorized into two major types according to method used to connect to a host computer facility, namely wired and wireless. Referring to FIG. 1. which shows a wired mouse A, a front end of which is connected to a connector A1, which provides for connecting to a host computer. However, when a user is using the wired mouse A, because of hindrance from the length of a connecting wire A2 to the host computer, thus, the wired mouse A must be close to the host computer, which often results in restricting movement of the wrist when using the wired mouse A or easily results in the connecting wire A2 becoming entangled with objects on the tabletop, thereby hindering use of the wired mouse A.

Figure 2:
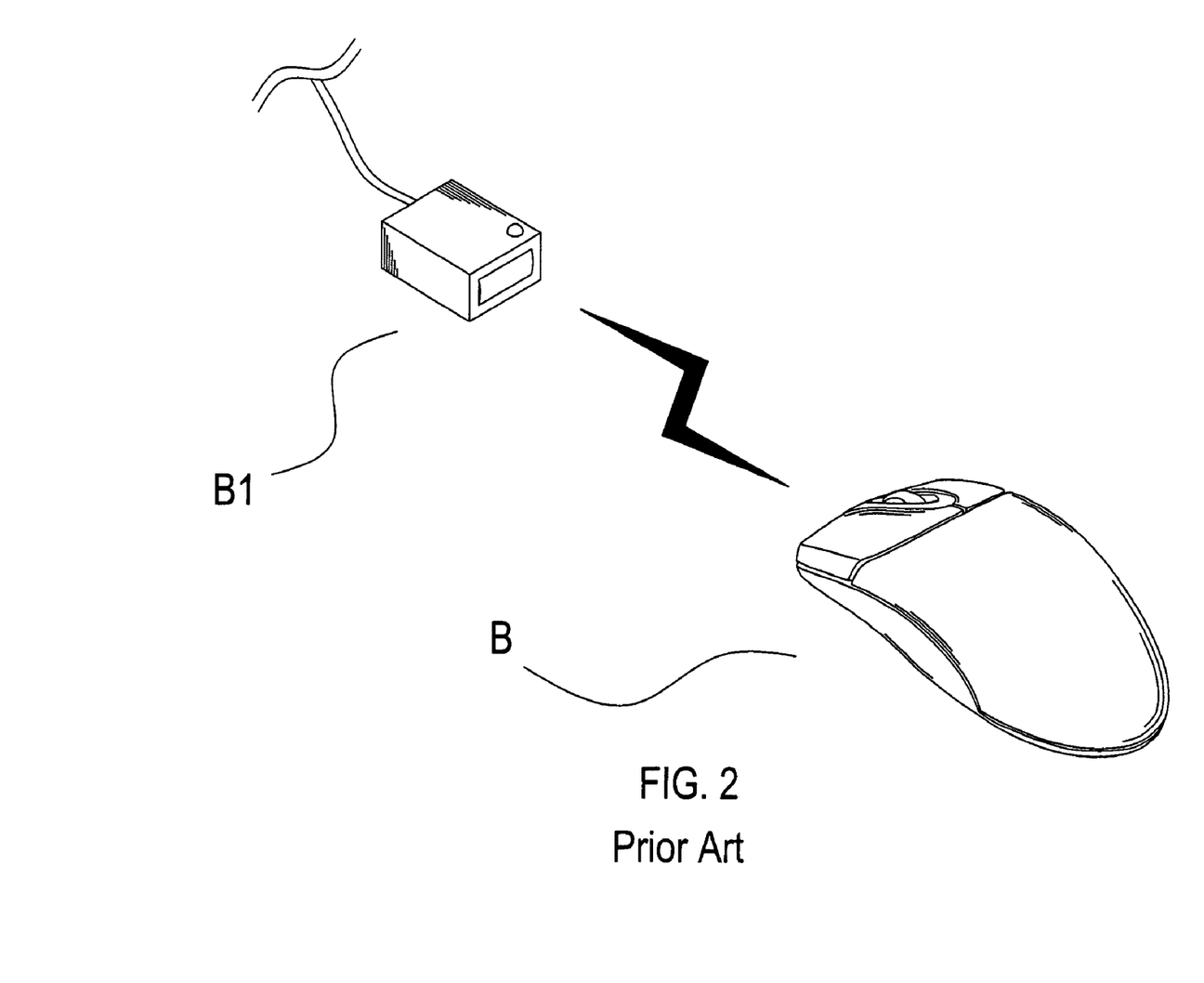
FIG. 2 shows an elevational view of a conventional wireless mouse

Referring to FIG. 2, which shows a wireless mouse B, which uses an internal wireless emitting circuit to emit wireless control signals, such as bluetooth, infrared rays, and so on, which are transmitted to the host computer after being received by a receiver B1. However, an internal battery must be replaced after using the wireless mouse B for a period of time. Moreover, the user often only knows that the battery is low when the battery power has exhausted or is notified through control software or a warning device of the wireless mouse B. Furthermore, the user is often notified with a low battery signal when he most needs the battery and cannot find a replacement. If the user is editing an important document or a time critical document when the battery is low, then a time critical moment is missed. In addition, apart from having to regularly purchase batteries, there is also the problem of environmental protection recycling of the batteries, which adds further exasperation on the part of the user.

Hence, the inventor of the present invention proposes to resolve and surmount existent technical difficulties to provide a mouse with self-charging functionality and adaptability to accommodate the preferred operating mode of the user whereby the user is able to change between a wired or wireless mode of operation as he pleases.

SUMMARY OF THE INVENTION

Figure 3:
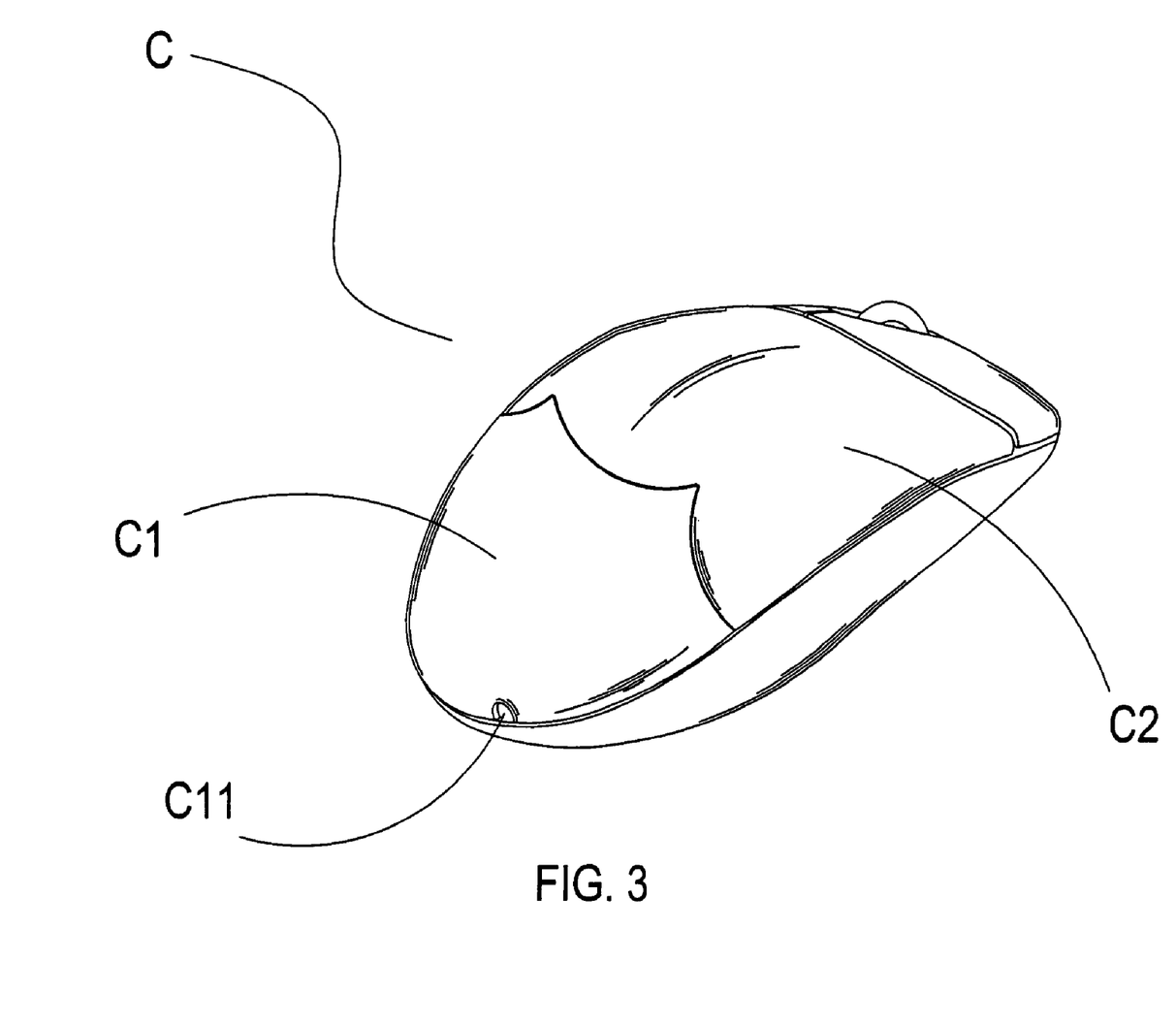
FIG. 3 shows an elevational view according to the present invention.
Figure 4:
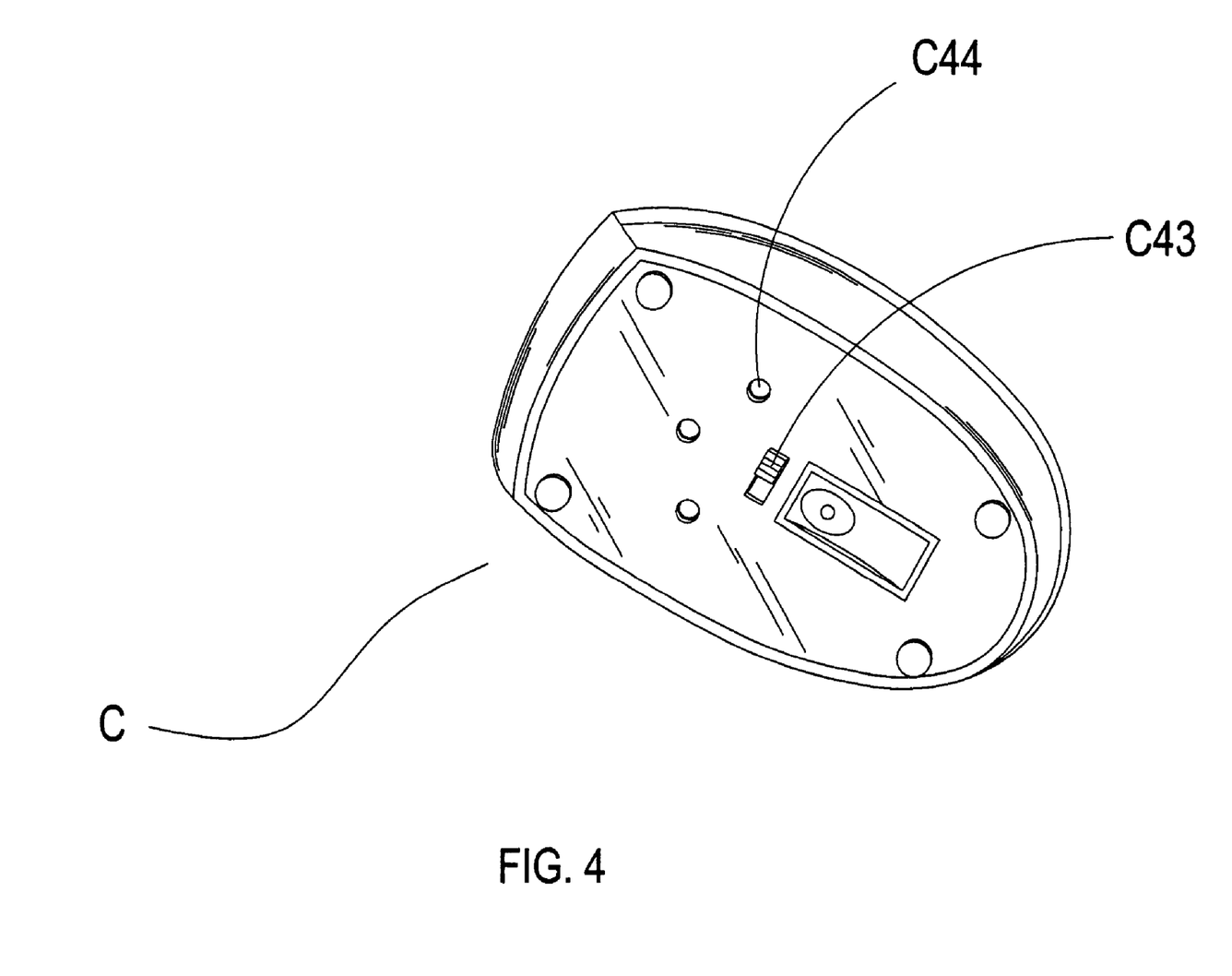
FIG. 4 shows an upward elevational view according to the present invention.

The present invention provides a wired/wireless chargeable mouse. Referring to FIGS. 3, 3-1 and 4, which show a mouse of the present invention structured to comprise a mouse cover, a top cover, a battery, a circuit board and a bottom cover;

wherein the top cover is configured with a battery compartment, a coil winding mechanism, a connector and a connecting wire;

wherein the circuit board is configured with an emitting circuit and a charging circuit, a switch and light-emitting diodes.

The present invention is structurally characterized in that the circuit board is disposed within the bottom cover, which is then covered by the top cover. The battery is disposed within the battery compartment. The connecting wire of the coil winding mechanism is connected to the circuit board, and the mouse cover is placed on top thereof. The connector is configured on one end of the connecting wire of the coil winding mechanism. Pulling out the connector simultaneously actuates the coil winding mechanism, thereby outwardly extending the connecting wire. A through hole is further defined on a side edge of the mouse cover. The through hole is used to press fit the connecting wire after outwardly extending the connecting wire. When the connector is connected to a host computer facility, electric power from the host computer is transmitted to the battery compartment through the connector, thereby charging the battery.

The light-emitting diodes produce different luminescent displays corresponding to different states of the mouse, for instance, low battery state, charging state, the mouse being used in wireless mode or the mouse being used in wired mode. Furthermore, a transparent casing is used as the bottom cover of the mouse, thereby enabling light rays emitted by the light-emitting diodes to pass therethrough.

The connector can be further configured as a USB (Universal Serial Bus) connector, PS/2 (Personal System/2) connector or other related computer peripheral terminal connector interfaces.

The emitting circuit can be adapted to use infrared rays, bluetooth, FM (Frequency Modulation), AM (Amplitude Modulation) or other related wireless signal transmission technology to function as mode for transmitting signals.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 5:
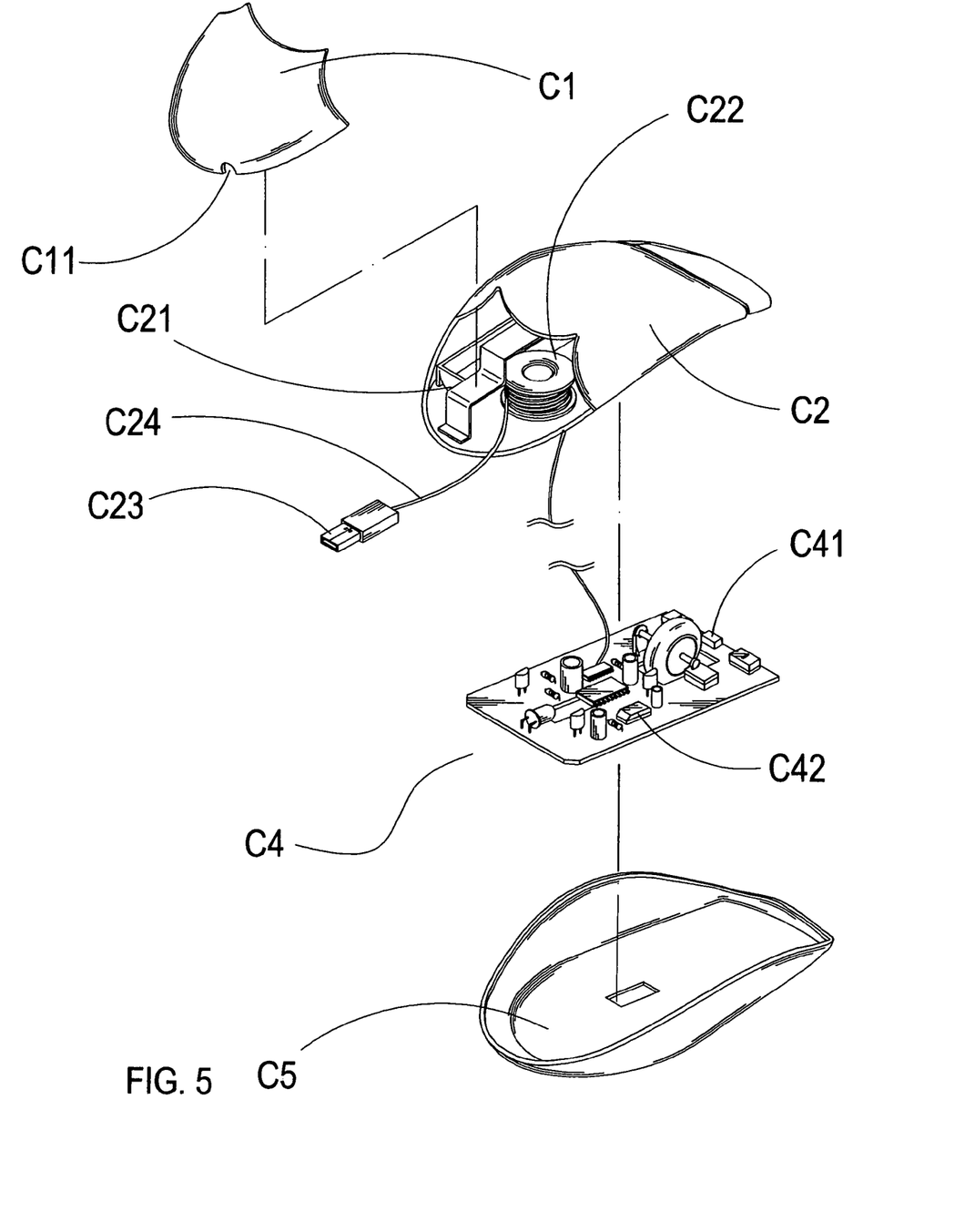
FIG. 5 shows an exploded elevational view according to the present invention.

Referring to FIGS. 5 and 5a, which show embodiments of the present invention, wherein light-emitting diodes C44 produces different luminescent displays corresponding to different states of a mouse C, an emitting circuit C41 within the mouse C (see FIG. 5) simultaneously emits wireless control signals to a receiver E1 of the computer E.

Figure 6:
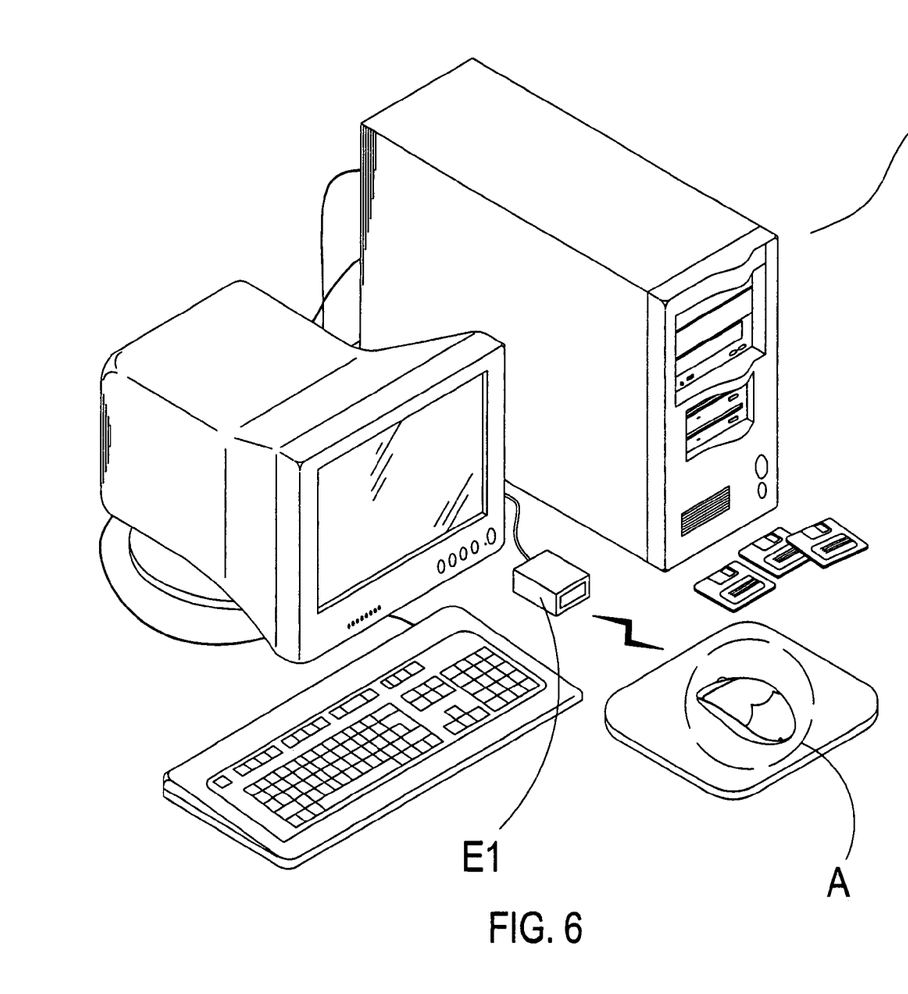
FIG. 6 shows a schematic view of the present invention in use.
Figure 6A:
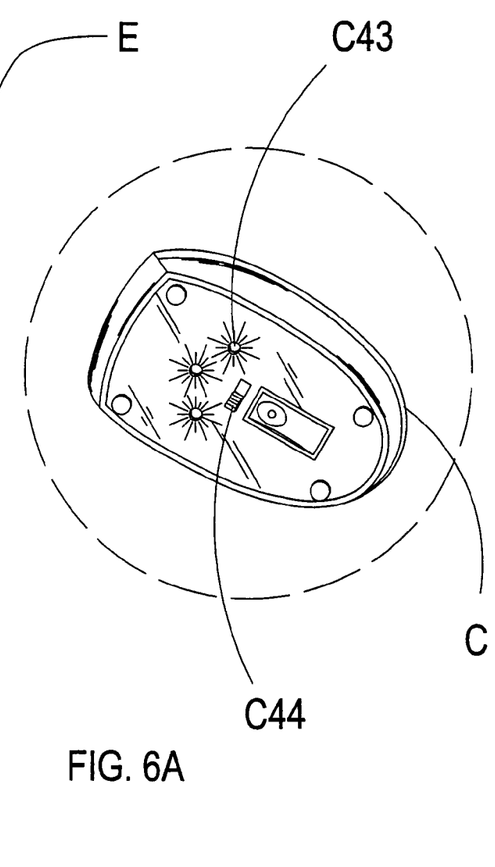
FIG. 6A shows an enlarged upward view of the mouse of FIG. 6 according to the present invention.
Figure 7:
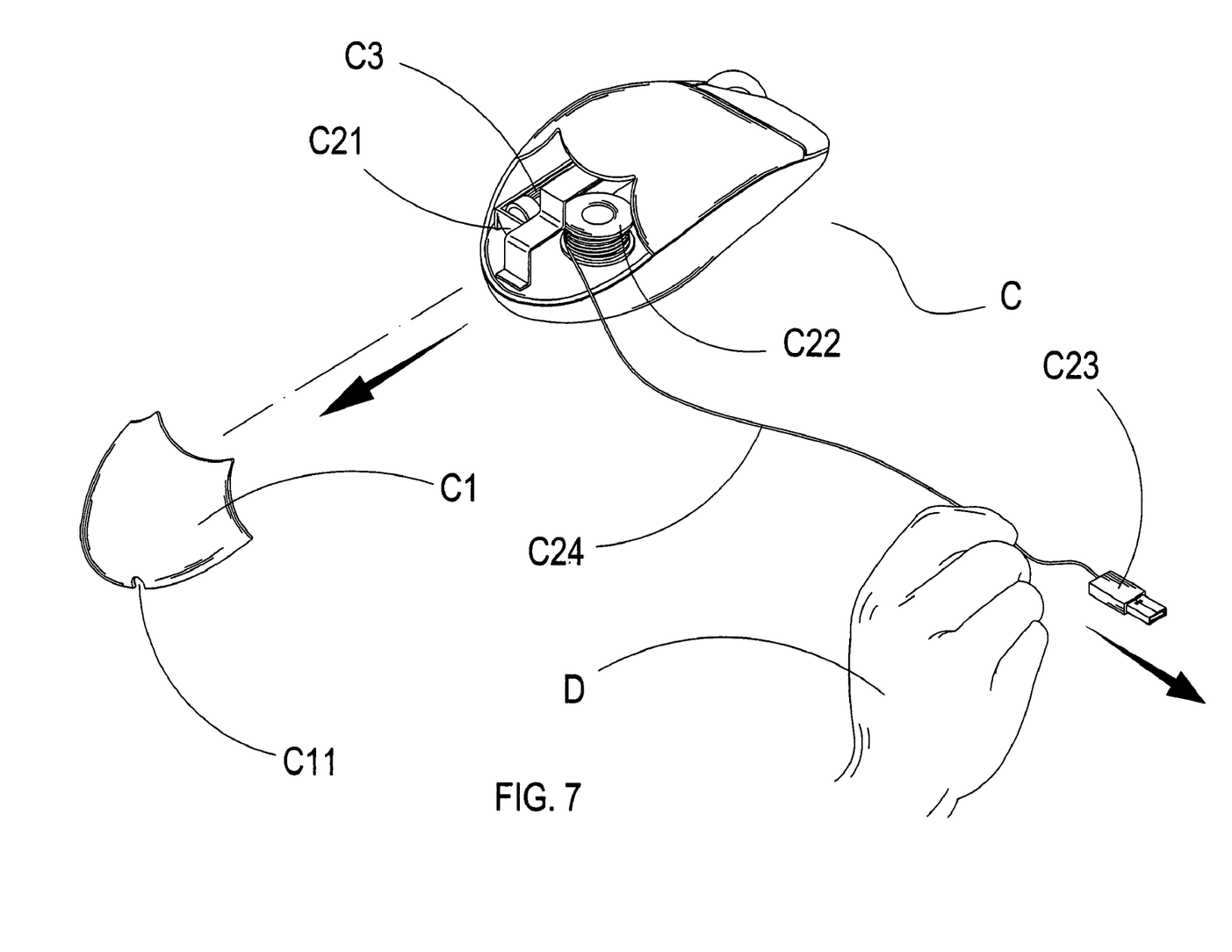
FIG. 7 shows an elevational view of an embodiment according to the present invention (1).
Figures 8, 8A:
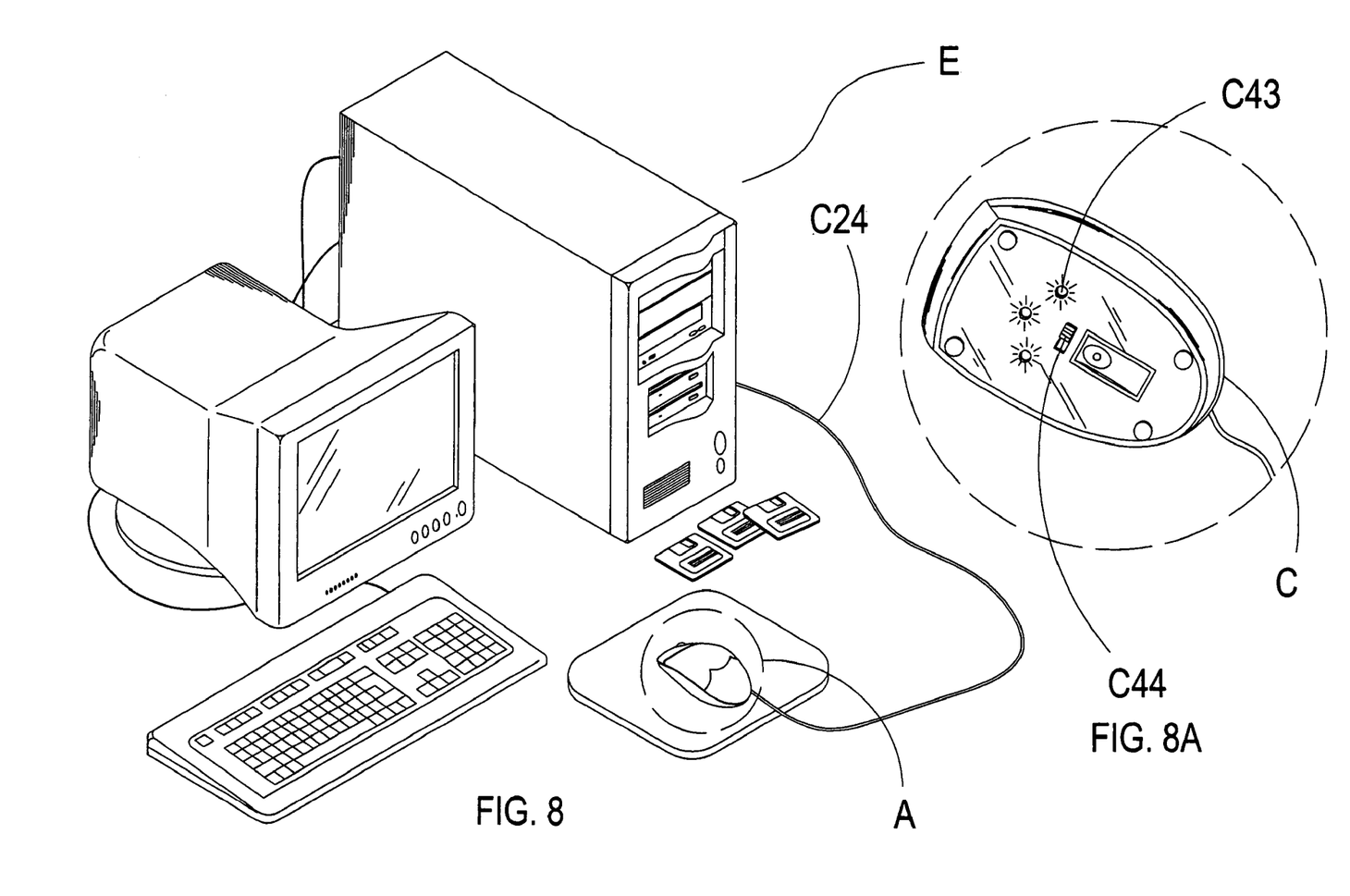
FIG. 8 shows a schematic view of an embodiment according to the present invention (2).
FIG. 8A shows an enlarged upward view of the mouse of FIG. 8 according to the present invention.

Referring to FIGS. 6, 7 and 7a, after dismantling a mouse cover C1 from the mouse C, a user pulls on a connector C23 and a connecting wire C24 with the hand D, thereby enabling a coil winding mechanism C22 to unwind the connecting wire C24. After the user has pulled out the connecting wire C24 to an appropriate length, the mouse cover C1 is replaced on the mouse C, whereupon a through hole C11 of the mouse cover C1 press fits the connecting wire C24, thereby transforming the mouse C from a wireless mode of operation into a wired mode of operation, while simultaneously charging a battery C3 through the connector C23 connected to a computer E.

Figure 9:
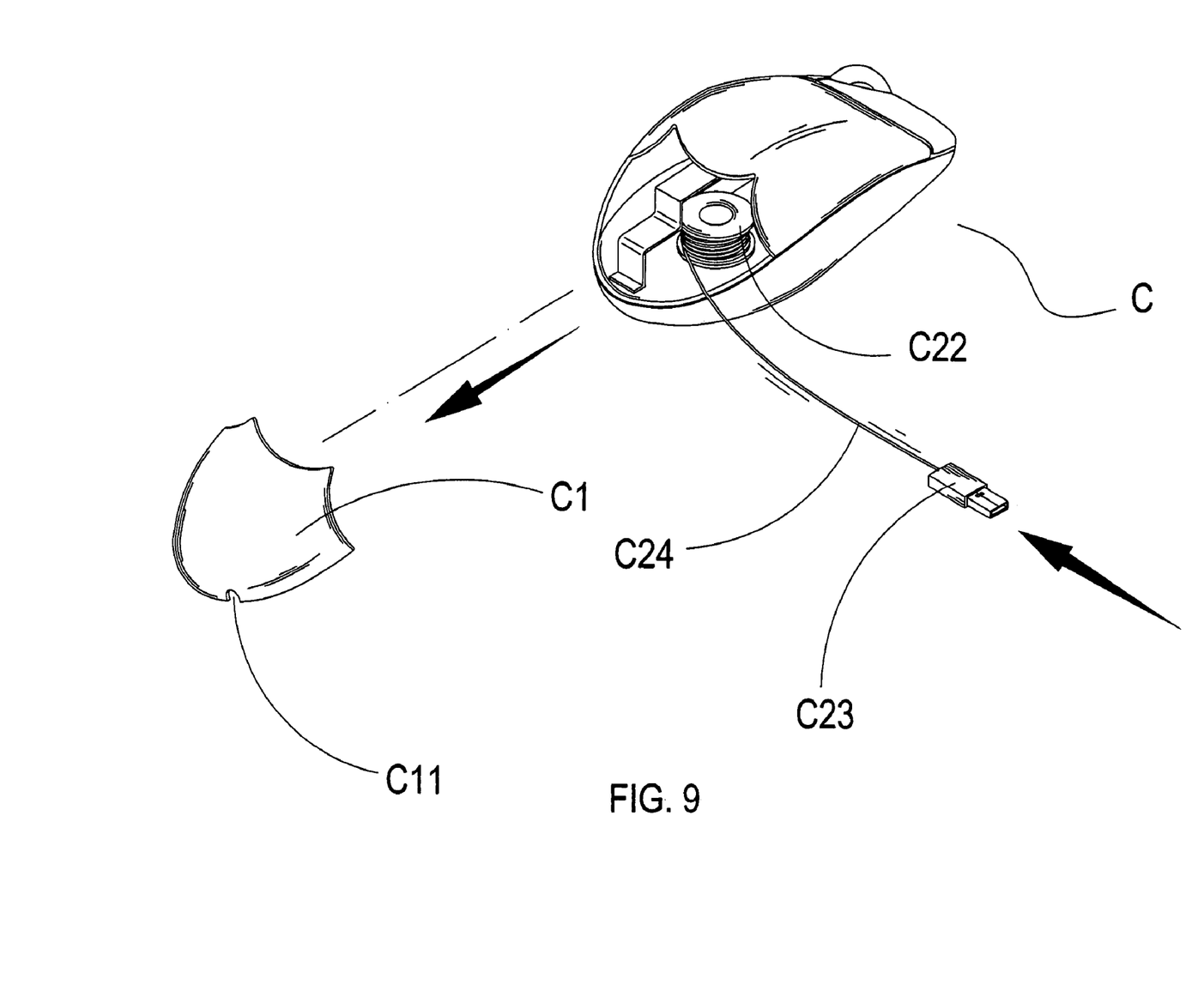
FIG. 9 shows an elevational view of an embodiment according to the present invention (3).

Referring to FIG. 9, which shows the mouse C adopted as a wired type mouse. When the mouse C is not in use or the user needs to carry the mouse C, after dismantling the mouse cover C1, the connecting wire C24 and the connector C23 of the mouse C are rewound into the mouse C by the coil winding mechanism C22, which thus makes for easy portability and storage of the mouse C.

In order to better explicitly disclose advancement and practicability of the present invention, a comparison with conventional art is described hereinafter:

Shortcomings of a conventional mouse:

1. A connecting wire of a wired mouse easily becomes entangled with objects on the tabletop, resulting in inconvenience when using the mouse.

2. Limitations are imposed by length of the connecting wire when using the wired mouse, thereby restricting range of movement of the hand of the user when using the mouse.

3. The battery of a wireless mouse must be immediately replaced when the battery is low.

4. The wireless mouse cannot be used When the user has no battery to replace the low battery.

5. The wireless mouse is unable to self-charge, and, thus, the battery must be regularly replaced to the increasing annoyance of the user.

Advantages of the present invention:

1. Combines characteristics of a wired mouse and a wireless mouse.

2. The battery C3 can be charged using the connecting wire C24 and the connector C23.

3. Eliminates the need to replace the battery C3 of the mouse C when the battery is low, thus enabling uninterrupted use of the mouse C.

4. The mouse C is configured with the coil winding mechanism C22, which can rewind and unwind the connecting wire C24 and the connector C23.

5. Because the mouse C can be used as a wireless mouse, thus, restrictions imposed by the connecting wire C24 when using the mouse C is reduced.

6. Provided with advancement, practicability and convenience.

7. Enhances industrial competitiveness.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A wired/wireless chargeable mouse comprising:
   a) a top cover having:
      i) a battery compartment located an interior thereof;
      ii) a coil winding mechanism located in the interior thereof;
      iii) a connecting wire connected to the coil winding mechanism; and
      iv) a connector located on one end of the connecting wire of the coil winding mechanism, the connector and the connecting wire are movable between first and second positions;
   b) a mouse cover removably connected to the top cover and having a through hole located on a side edge thereof;
   c) a battery located in the battery compartment;
   d) a bottom cover; and
   e) a circuit board located in the bottom cover and covered by the top cover, the circuit board having an emitting circuit, a charging circuit, a switch, and a plurality of light-emitting diodes, a second end of the connecting wire is connected to the circuit board;
   wherein, when the connector and the connecting wire are located in the first position, the connector and the connecting wire are located in the interior of the top cover, and the mouse is powered by the battery and operates as a wireless mouse, and
   wherein, when the connector and the connecting wire are located in the second position, the connector and a predetermined length of the connecting wire are located on an exterior of the top cover, the connecting wire extending through and secured by the through hole of the mouse cover, the connector is connect to the computer and control signals are transmitted through the connector, the mouse is powered by the computer and the battery is charged by the computer, and the mouse operates as a wired mouse.

2. The wired/wireless chargeable mouse according to claim 1, wherein the light-emitting diodes are located on a bottom portion of the circuit board.

3. The wired/wireless chargeable mouse according to claim 1, wherein the light-emitting diodes produce a plurality of luminescent displays, each of the plurality of luminescent displays correspond to one of a plurality of states of the mouse, and the bottom cover is a transparent casing, the plurality of light-emitting diodes emitting light rays through the bottom cover.

4. The wired/wireless chargeable mouse according to claim 2, wherein the light-emitting diodes produce a plurality of luminescent displays, each of the plurality of luminescent displays correspond to one of a plurality of states of the mouse, and the bottom cover is a transparent casing, the plurality of light-emitting diodes emitting light rays through the bottom cover.

5. The wired/wireless chargeable mouse according to claim 1, wherein the connector is selected from a group consisting of a universal serial bus connector, and a PS/2 (personal system/2) connector.

6. The wired/wireless chargeable mouse according to claim 2, wherein the connector is selected from a group consisting of a universal serial bus connector, and a PS/2 (personal system/2) connector.

7. The wired/wireless chargeable mouse according to claim 1, wherein the emitting circuit uses a wireless signal transmission technology selected from a group consisting of infrared rays, bluetooth, FM (frequency modulation), and AM (amplitude modulation) for transmitting signals.

* * * * *